United States Patent
Sun et al.

(10) Patent No.: US 9,262,488 B2
(45) Date of Patent: Feb. 16, 2016

(54) 2-DIMENSIONAL MULTI-HIERARCHY DISPLAY

(71) Applicant: SAP AG, Walldorf (DE)

(72) Inventors: Fan Sun, Shanghai (CN); Zhichao Huang, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/678,478

(22) Filed: Nov. 15, 2012

(65) Prior Publication Data

US 2014/0129595 A1   May 8, 2014

(30) Foreign Application Priority Data

Nov. 7, 2012   (CN) .......................... 2012 1 0441539

(51) Int. Cl.
  *G06F 17/30*   (2006.01)
(52) U.S. Cl.
  CPC ................................ *G06F 17/30554* (2013.01)
(58) Field of Classification Search
  USPC ................................................. 707/791, 797
  See application file for complete search history.

(56) References Cited

U.S. PATENT DOCUMENTS

| | | | |
|---|---|---|---|
| 6,339,767 B1 * | 1/2002 | Rivette et al. ................. | 707/781 |
| 6,392,667 B1 * | 5/2002 | McKinnon et al. ........... | 715/738 |
| 7,720,857 B2 * | 5/2010 | Beringer et al. .............. | 707/766 |
| 7,853,552 B2 * | 12/2010 | Beringer et al. | |
| 7,941,446 B2 * | 5/2011 | Hubert .......................... | 707/791 |
| 7,949,964 B2 * | 5/2011 | Vimme ......................... | 715/853 |
| 7,953,768 B2 * | 5/2011 | Gould et al. .................. | 707/805 |
| 8,001,015 B2 * | 8/2011 | Perrier et al. ................ | 705/26.7 |
| 8,239,413 B2 * | 8/2012 | Hubert .......................... | 707/791 |
| 8,250,041 B2 * | 8/2012 | Pogodin ........................ | 707/662 |
| 8,332,782 B1 * | 12/2012 | Chang et al. .................. | 715/853 |

* cited by examiner

*Primary Examiner* — Kim Nguyen
(74) *Attorney, Agent, or Firm* — Horizon IP Pte. Ltd.

(57) ABSTRACT

Described herein is a technology for facilitating visualization of multiple hierarchies. In some implementations, a primary hierarchy having primary components arranged in different primary hierarchical levels is provided. A second hierarchy for the primary components of the primary hierarchy is provided. The primary components are configured as geometric objects with concentric zones corresponding to different secondary hierarchical levels with secondary components.

21 Claims, 10 Drawing Sheets

2-DIMENSIONAL MULTI-HIERARCHY DISPLAY

TECHNICAL FIELD

The present disclosure relates generally to intelligent tools. In particular, the present disclosure relates to an intelligent tool for visualizing information of multiple hierarchies.

BACKGROUND

A hierarchy is typically visualized as a pyramid or a tree structure. At the top of the tree structure is the highest component of the hierarchy while all other components below it are subordinate components. The position of a component represents its rank. For example, higher ranking components are positioned above lower ranking components while equivalent ranking components are positioned similarly in the tree structure.

Components within a hierarchy may have their own hierarchies. To visualize the different hierarchies, separate tree structures are employed. For example, different hierarchies are represented using different views. This is because conventional tree structures used in visualizing hierarchies are ineffective for visualizing multiple hierarchies in a single view.

The present disclosure is directed to effectively visualize multiple hierarchies.

SUMMARY

A computer-implemented method for facilitating visualization of multiple hierarchies is described herein. The method includes providing a primary hierarchy having primary components arranged in different primary hierarchical levels. The method also includes providing a secondary hierarchy for the primary components of the primary hierarchy. The primary components are configured as geometric objects with concentric zones corresponding to different secondary hierarchical levels with secondary components. An innermost concentric zone of the geometric objects is the highest secondary level of the secondary hierarchy and outer concentric zones correspond to lower secondary levels of the secondary hierarchy, with an outermost concentric zone corresponding to the lowest secondary level of the secondary hierarchy. The concentric zones at lower secondary levels are divided into segments corresponding to a number of secondary components in the lower secondary levels.

In one embodiment, a computer-implemented method of visualizing multiple hierarchies is disclosed. The method includes providing a primary hierarchy having primary components arranged in different primary hierarchical levels. The method also includes providing a secondary hierarchy for the primary components of the primary hierarchy. The primary components are configured as geometric objects with concentric zones corresponding to different secondary hierarchical levels with secondary components.

In one embodiment, a non-transitory computer-readable medium having stored thereon program code is disclosed. The program code is executable by a computer to provide a primary hierarchy having primary components arranged in different primary hierarchical levels and a secondary hierarchy for the primary components of the primary hierarchy. The primary components are configured as geometric objects with concentric zones corresponding to different secondary hierarchical levels with secondary components.

In yet another embodiment, a system is disclosed. The system includes a non-transitory memory device for storing computer-readable program code. The system also includes a processor in communication with the memory device. The processor is being operative with the computer-readable program code to provide a primary hierarchy having primary components arranged in different primary hierarchical levels and a secondary hierarchy for the primary components of the primary hierarchy. The primary components are configured as geometric objects with concentric zones corresponding to different secondary hierarchical levels with secondary components.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for displaying data is described herein. The display framework may be used, for example, to display business information to enhance the decision making process. In one implementation, the present framework can evaluate the effectiveness of dashboards used to visualize data. The framework may provide guidance to, for example, dashboard designers to improve the workflow related to designing dashboards.

Figure 1:
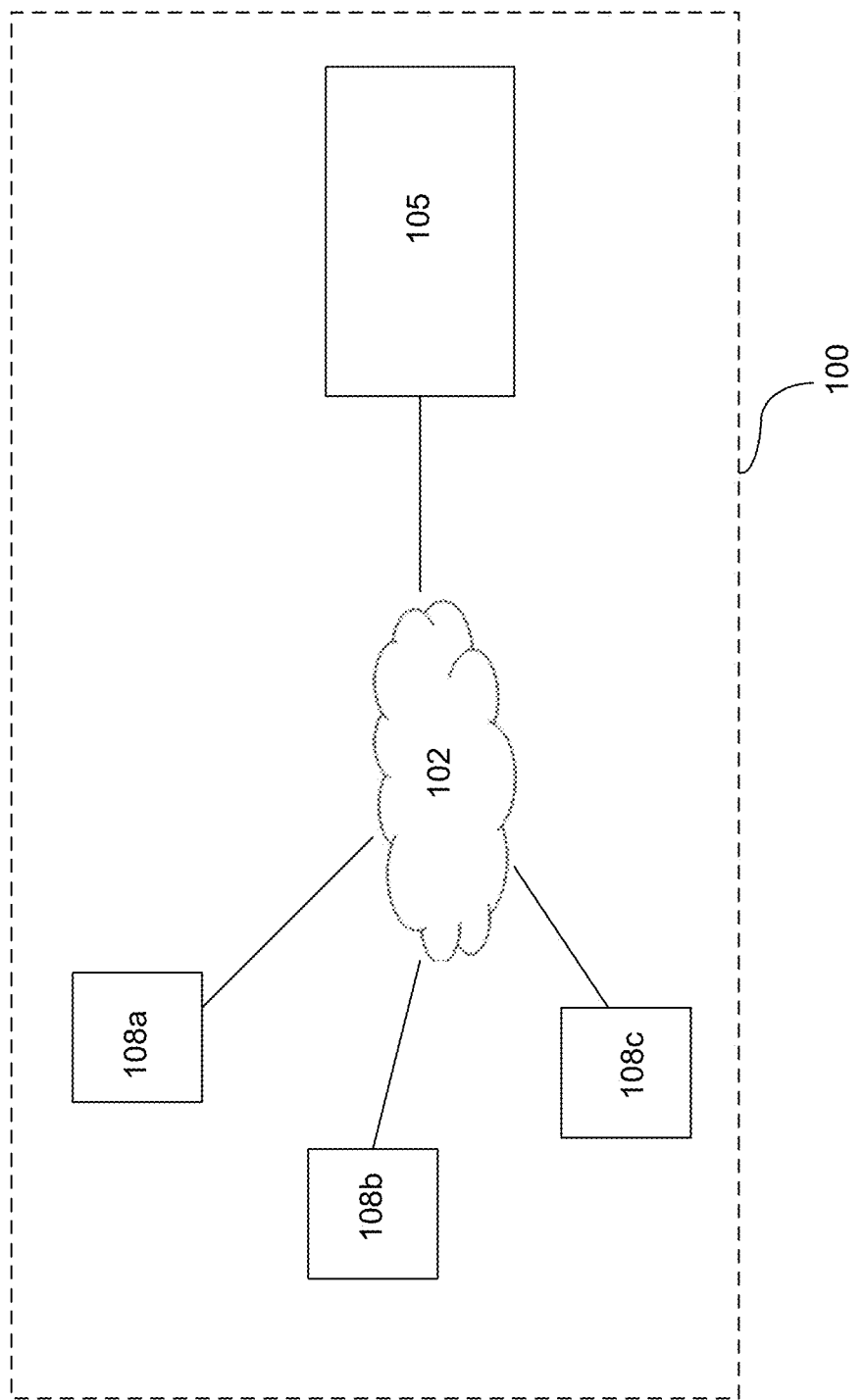
FIG. 1 shows an embodiment of an environment.

FIG. 1 shows a block diagram of an exemplary environment 100. The environment, for example, facilitates data visualization. The environment may have a client/server architecture. For example, the environment may be a distributed client/server architecture. In one embodiment, the environment includes one or more clients 108a-c and a server 105 communicatively coupled via a communication network 102. Clients 108a-c may access the server 105 to store information and/or retrieve information maintained on the server. Furthermore, the server may facilitate communication between clients. Other types of environments may also be useful. For example, the environment may be a cloud computing environment.

The communication network, for example, may be a local area network (LAN) which interconnects different devices, such as the clients and server. Other types of networks may also be useful. The devices may be coupled via the network by wireless and/or wired connections.

The server, in one embodiment, may be a computer which includes a memory and a processor. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

Although the environment is illustrated with one server, it is understood that more than one server, such as a server pool, as well as computers other than servers, may be employed.

The memory of the server may include any non-transitory memory or database module. The memory may be volatile or non-volatile types of memories, such as magnetic media, optical media, random access memory (RAM), read-only memory (ROM), removable media, or any other suitable local or remote memory component.

A client may be a local or remote computing device with, for example, local memory and a processor. The memory may include fixed and/or removable storage media such as a magnetic computer disk, CD-ROM, or other suitable media. Various types of processing devices may serve as a client. For example, the client may be a PC, tablet PC, workstation, network computer, kiosk or personal data assistant (PDA). Other types of processing devices may also be used. The processing devices may include a memory and a processor. Input and output devices may be provided for the processing device. The input device may be, for example, a keypad, touch screen, mouse, or other device that can accept information from a user. For example, a client may receive requests from a user using the input device. The output device may be a display to convey information to a user. Other types of input and output devices may also be useful. The clients can receive, transmit, process and store any appropriate data associated with the environment 100.

Client/server (C/S) applications may be provided in the environment. Generally, C/S applications include front end and back end portions. The front end portions are stored locally on the clients while the back end portions are located in the server. Various types of C/S applications may be provided in the environment.

A client may include a user interface for a user to interface with the environment for various purposes. For example, the interface may be used to access various applications in the environment. The user interface may also serve other purposes. In one embodiment, the user interface comprises a graphical user interface (GUI). A GUI may provide an efficient and user-friendly manner of presenting information or communicating with the environment. For example, a GUI may include a task menu as well as one or more panes for displaying information. Other types of user interfaces, such as command line interface (CLI), may also be useful. The type of user interface may depend on the type of application running on the client. For example, the front end portion may include a GUI to enable a user to interact with the back end portion to access data stored in the server.

Although the environment is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as the email system. Any user may access the user's respective account from any client by performing an authentication or a login process, such as providing a user name and password.

Figure 2:
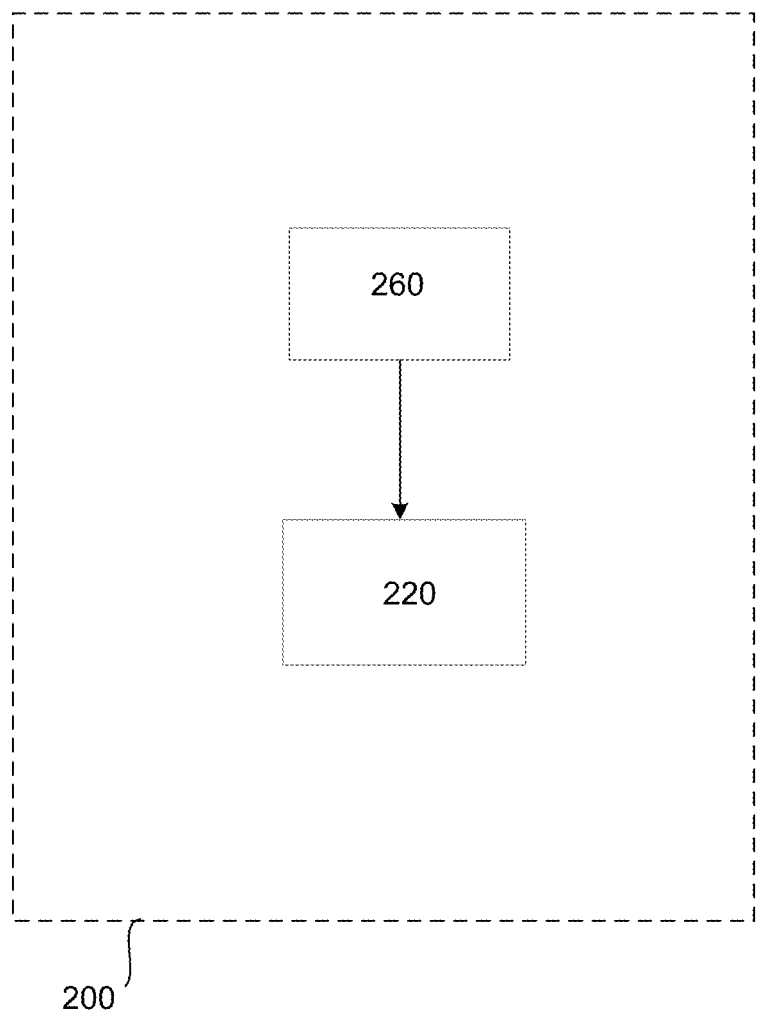
FIG. 2 shows an embodiment of a software environment.

FIG. 2 shows an embodiment of a software environment 200. As shown, the software environment includes a data source 260. The data source, for example, may include data files. Any type of files may also be contained in the data source. The files, for example, may be reports, spreadsheets, XML files, flat files, web service files or other types of files. The data files may be generated from one or more software applications, such as database or other types of software applications. For example, data may be personal data or business data, such as data of a company. Business data can include employee data, sales data, as well as other types of data related to a company. In one embodiment, the data source includes files related to hierarchies. The hierarchies, for example, include primary and secondary hierarchies.

The software application may include various types of functions, such as report generation and functions related to data analytics. The software application may have a C/S architecture. For example, data, reports and other information may be stored in a server. In other embodiments, the software application may be locally installed in a client or a standalone computer. In such cases, the data, reports and other information are locally stored.

In one embodiment, the software application comprises a business application. Various types of business applications may be used. The business application, for example, maintains data of a business or company and creates business reports relating to the data. Such business applications may include, for example, SAP Crystal Solutions, including Xcelsius, Crystal Reports, Web Intelligence from SAP AG. Other types of business applications or suites of business applications may also be useful. For example, the application may be governance, risk and compliance (GRC) application, such as SAP Business Objects GRC application.

An information hierarchy visualization (IFV) application 220 is provided in the software environment. The IFV application is used to display or configure information of multiple hierarchies in a 2-dimensional display or view. In one embodiment, the IFV application displays first and second hierarchies. The IFV, for example, displays a primary hierarchy and a secondary hierarchy. The secondary hierarchy, for example, is a hierarchy of components or units in the primary hierarchy. For example, the secondary hierarchy is a hierarchy within the primary hierarchy. In some embodiments, the primary hierarchy may include multiple secondary hierarchies. IFV application may be dynamically configured to display any one of the secondary hierarchies with the primary hierarchy. Providing an IFV application which displays other number of hierarchies or configurations of hierarchies may also be useful.

In one embodiment, the primary hierarchy is an organization hierarchy and the secondary hierarchy is a subprocess-control structure (SCS) hierarchy. In other embodiments, the secondary hierarchy is a risk-control structure (RCS) hierarchy. In yet other embodiments, multiple secondary hierarchies are provided. For example, the secondary hierarchies may include SCS and RCS hierarchies. Other primary and secondary hierarchies may also be useful.

In one embodiment, the IFV application is integrated into a business application. For example, the IFV may be integrated into a GRC application, such as SAP® GRC. Other configurations of the IFV application may also be useful. For example, the IFV may be integrated into other types of business applications. In other embodiments, the IFV may be a standalone application, providing a visualization model for multiple hierarchies.

Figure 3:
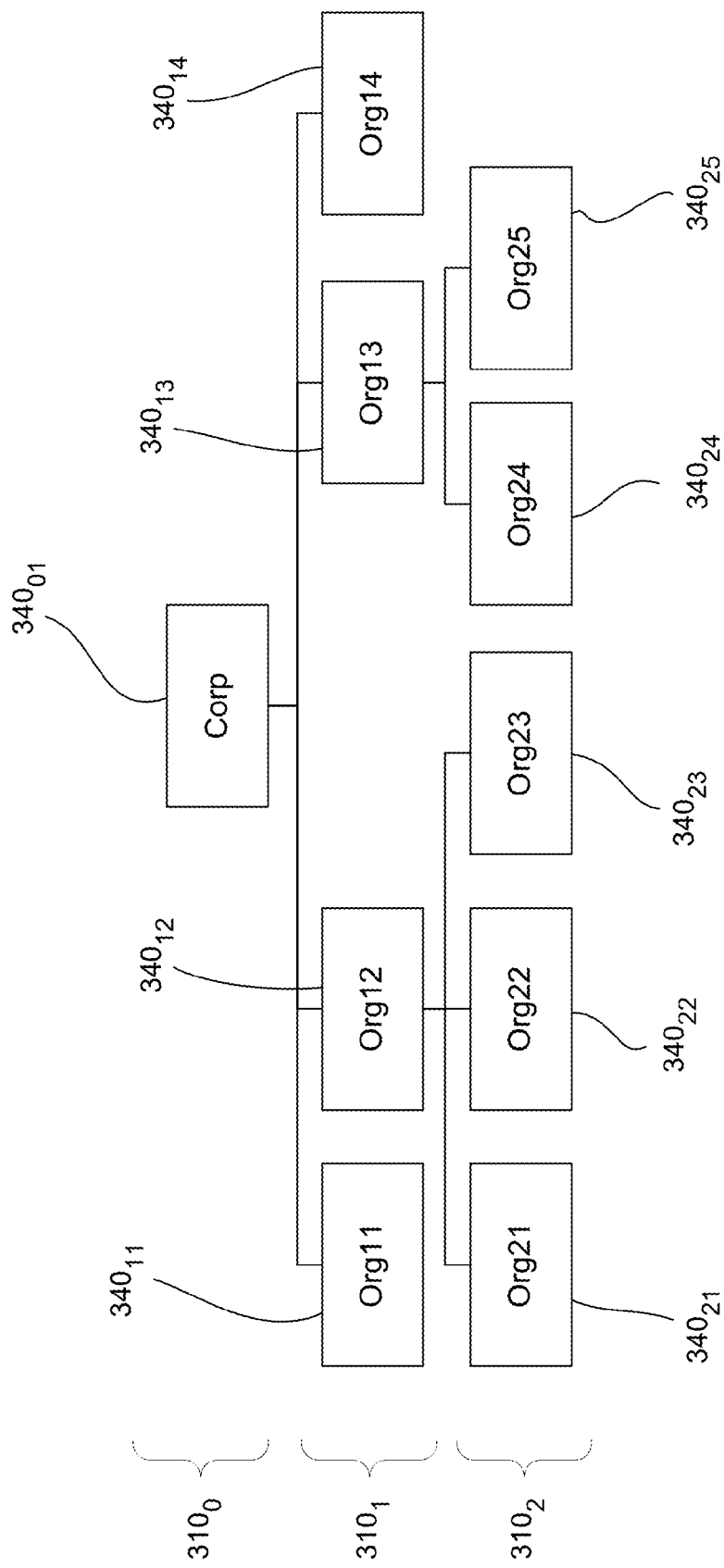
FIG. 3 shows an exemplary organizational hierarchy.

FIG. 3 shows an exemplary organization hierarchy 300. In one embodiment, the hierarchy is of an organization, such as a corporation. Other types of organizations may also be useful. The organization hierarchy has various organizational levels. For example, the organization hierarchy has h levels. As shown, the hierarchy has three levels $310_{0-2}$ (e.g., h=3). Providing a hierarchy with other number of levels may also be useful. The number of levels, for example, may depend on the model of the corporation.

The hierarchy includes units or organization units (org units) $340_{xn}$ at the different organizational levels. The subscript x corresponds to the level of the hierarchy and n corresponds to the number of units within a level. The relationships of the org units are indicated by lines, forming a tree structure. At the highest level $310_0$, org unit $340_{01}$ corresponds to the corporation. As for the lower levels, the org units correspond to different units of the corporation. For example, four intermediate level org units $340_{11}$, $340_{12}$, $340_{13}$ and $340_{14}$ correspond to four different major units of the corporation. The major units may include corporate, financial and business units. The intermediate level org units are reflected in the intermediate or second level $310_1$ of the hierarchy. Five bottom level org units $340_{21}$, $340_{22}$, $340_{23}$, $340_{24}$ and $340_{25}$ are provided. The bottom level org units may be org units (minor org units) of the major org units. For example, minor org units may be regional units of the major units. Regional units may be divided according to geographical regions, such as Asia, Americas and Europe. The bottom level org units are reflected in the bottom or third level $310_2$.

Illustratively, first, second and third bottom level org units $340_{21}$, $340_{22}$ and $340_{23}$ are minor units of the second intermediate org unit $340_{12}$ and fourth and fifth minor units $340_{24}$ and $340_{25}$ are minor units of the third intermediate org unit $340_{13}$. Not all intermediate org units have or need to have minor org units at the bottom level. It is understood that the organization hierarchy is merely for illustration purposes. An actual organization hierarchy may be different and reflects the corporation which is modeled. For example, the hierarchy may have different number of levels as well as org units.

An org unit of the corporation includes one or more subsets. In one embodiment, an org unit includes a SCS subset. Other types of subsets are also useful. For example, an org unit may include a RCS subset. In some cases, an org unit may include both SCS and RCS subsets. Providing an org unit with other types of subsets may also be useful. A subset is a node in the secondary hierarchy. For example, a subset maybe a subprocess or a risk. For example, a subset may be a subprocess for a SCS subset or a risk for a RCS subset. A subset includes one or more controls. For example, an organization may have different subprocesses and controls for those subprocesses or different risks and control for those risks.

Figure 4A:
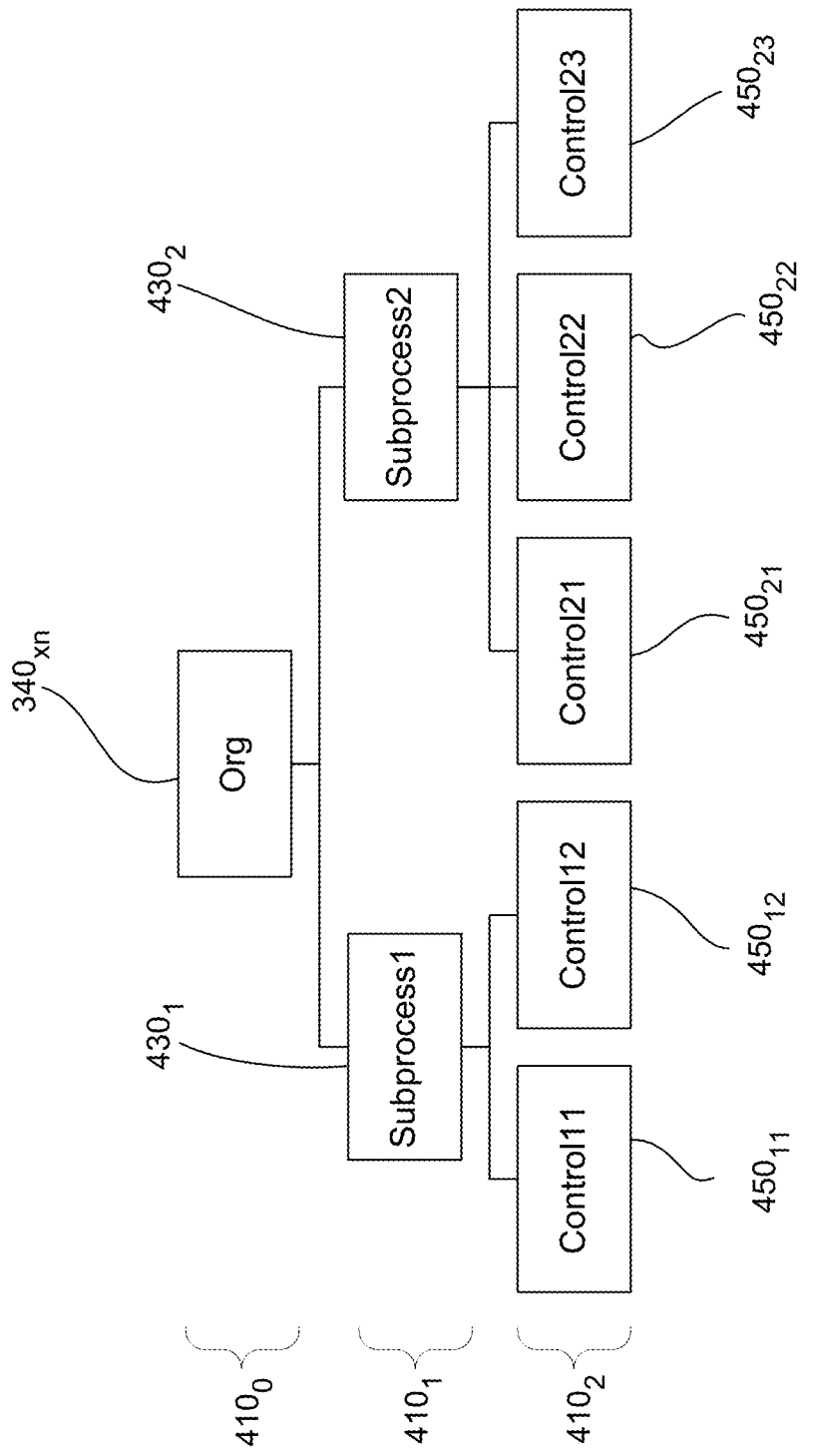
FIG. 4a shows an exemplary secondary hierarchy for a unit of an organizational hierarchy.

FIG. 4a shows an exemplary secondary hierarchy of a unit $340_{xn}$ of an org unit. The secondary hierarchy includes y plurality of levels. As shown, the secondary hierarchy includes three levels $410_{0-2}$ (e.g., y=3). Providing a secondary hierarchy with other number of levels may also be useful. The number of levels, for example, may depend on the model of the secondary hierarchy.

The highest level $410_0$ represents the org unit $340_{xn}$ to which the secondary hierarchy pertains. The relationships of the components of the different levels are indicated by lines, forming a tree structure. An org unit may include z subprocesses, where z is equal to or greater than 1. As shown, the secondary hierarchy is a SCS hierarchy. For example, the secondary hierarchy includes subprocesses in the second or intermediate level $410_1$. As shown, the unit includes first and second subprocesses $430_1$ and $430_2$. Providing an org unit with other number of subprocesses may also be useful. A subprocess may include one or more controls $450_{zm}$ in the bottom level $410_2$, where z corresponds to the subprocess of the org unit in the intermediate level and m corresponds to the number of controls in a subprocess. As shown, the first subprocess has two controls $450_{11}$ and $450_{12}$ while the second subprocess has three controls $450_{21}$, $450_{22}$ and $450_{23}$. Other hierarchies or relationships may also be useful and may depend on the SCS which is modeled. In the case of a RCS hierarchy, the intermediate levels would include risks instead of subprocesses.

As described, a unit includes three levels. It is understood that the different units of the primary hierarchy need not have the same number levels. For example, different units may have different models. Other configurations may also be useful.

Figure 4B:
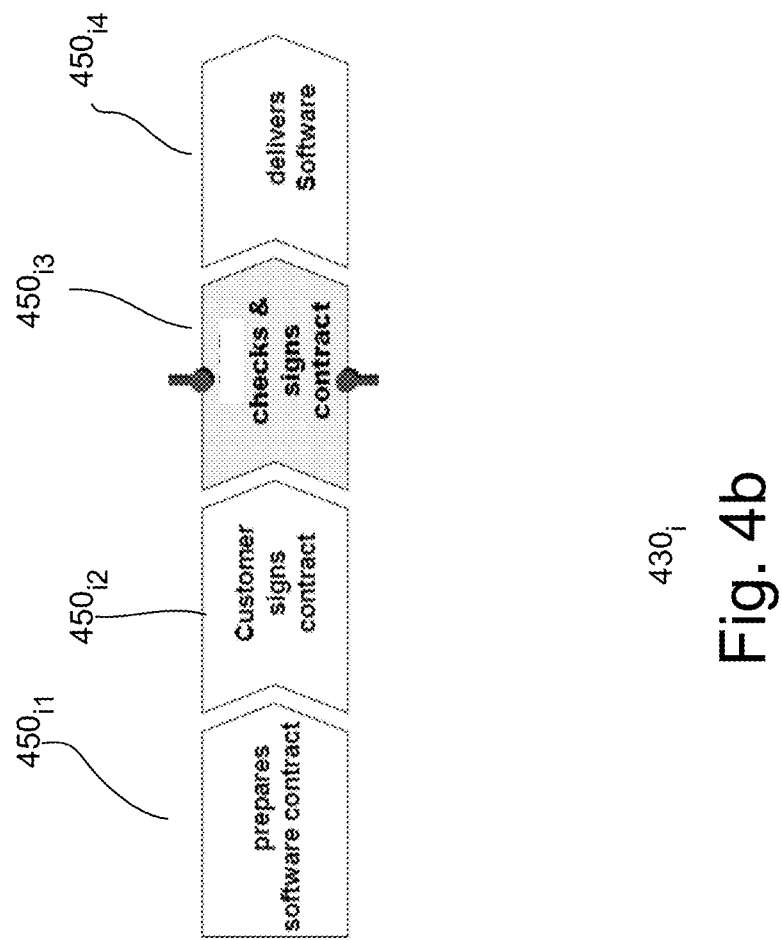
FIG. 4b shows an exemplary RCS subset.

FIG. 4b illustrates an exemplary subprocess subset $430_i$. The subset is related to a sales transaction. For example, the subset is related to the sale of a software product. The subset includes controls related to a sales transaction of the software product. As shown, the subset includes first, second, third and fourth controls $450_{i1}$, $450_{i2}$, $450_{i3}$ and $450_{i4}$. The first control is the preparation of a contract by the vendor, the second control $450_{i2}$ is execution of the contract by the customer, the third control $450_{i3}$ is to review the contract to ensure that that contract is signed by the customer and that there are no unfavorable modifications which may negatively impact the transaction and the fourth control $450_{i4}$ is the delivery of the software, completing the process.

The controls may be sequential in nature. For example, the next step in the process is not performed until the associated control of the previous step is indicated as approved or signed-off. For example, this may avoid the risk that software is delivered to a customer prematurely. Additionally, this ensures that the requirements for revenue recognition are fulfilled. Other configurations of controls may also be useful. The controls may be parallel controls or a combination of parallel and serial controls, for example, depending on the model.

The information related to the hierarchies may be stored in, for example, a database. The information may include organization units and their relationships. An organization unit may include associated subprocesses and controls. Based on this information, the IFV may be employed to display the hierarchies. The information may be stored in various forms. For example, the information may be stored in a single file or multiple files.

Figure 5:
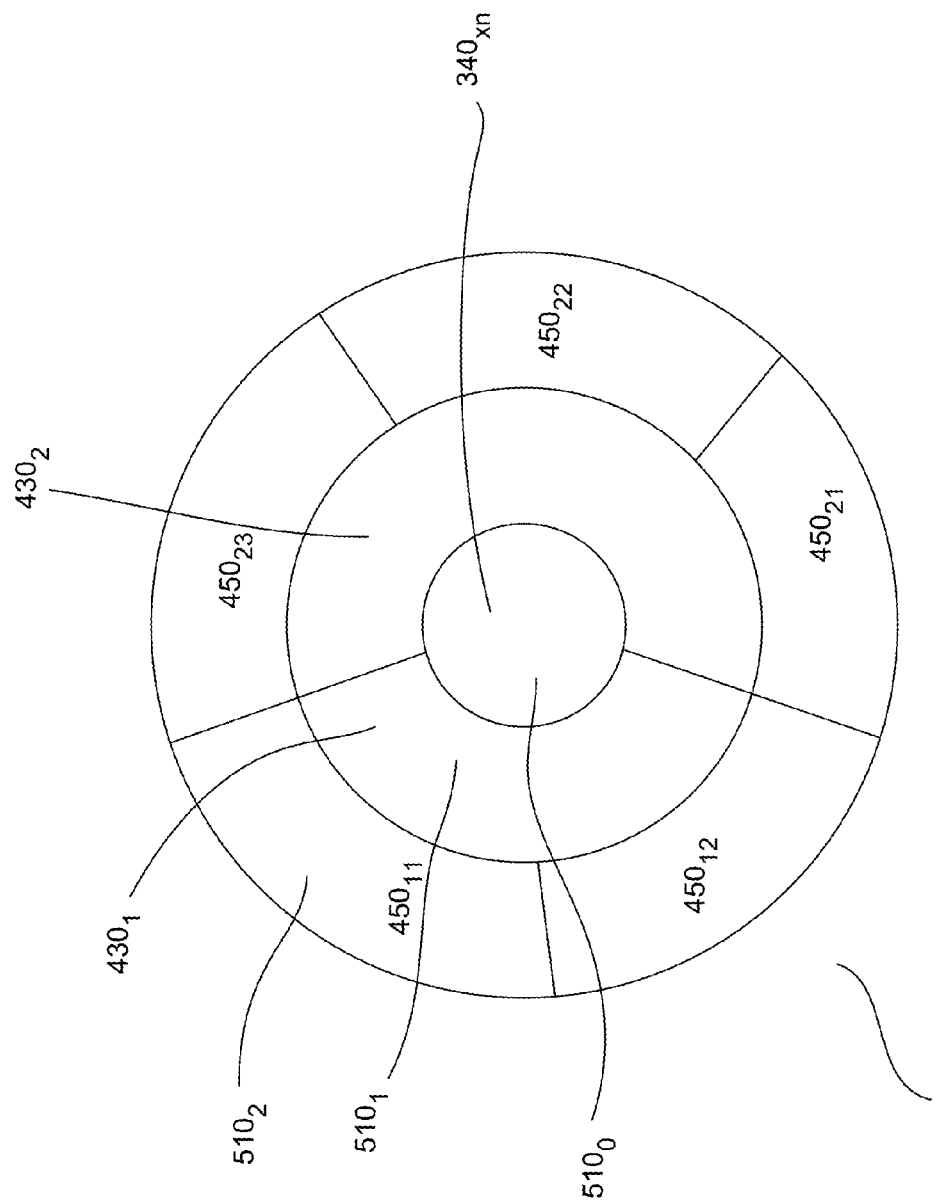
FIG. 5 shows an exemplary embodiment of a 2-dimensional representation of a secondary hierarchy for a unit of an organizational hierarchy.

FIG. 5 shows an embodiment of a 2-dimensional (2-D) display or representation of a secondary hierarchy 500 of an org unit $340_{xn}$. In one embodiment, the secondary hierarchy is a SCS hierarchy of an org unit. Other types of secondary and primary hierarchies may also be useful. For example, the secondary hierarchy may be a RCS hierarchy. The SCS hierarchy, for example, corresponds to the SCS tree hierarchy 400 of FIG. 4. Common elements may not be described or described in detail.

The SCS hierarchy, in one embodiment, is represented by a radial object 501. The radial object, for example, may be a radial geometric object or figure, such as a radial circular object. Other geometric shapes for the radial object may also be useful. The radial object includes y concentric zones extending from the center. The number of concentric zones corresponds to number of levels in the SCS hierarchy. In one embodiment, the radial object includes three concentric zones $510_{0-2}$, corresponding to three levels in the SCS hierarchy. Providing other number of concentric zones may also be useful.

In one embodiment, the innermost zone is the highest level of the hierarchy and decreases as it extends outward from the radial object. For example, the intermediate concentric zone is the intermediate level and the outermost concentric zone is the lowest level. In one embodiment, an org unit $340_{xn}$ is disposed in the innermost zone. As for the intermediate concentric zone, it includes, for example, the subprocesses of the organizational unit. The intermediate zone is divided into z intermediate segments. A segment is a subprocess of the organizational unit. For example, z intermediate segments are provided for an organizational unit with z subprocesses. As shown, the organizational unit includes first and second subprocesses $430_{1-2}$ (e.g., z=2).

Controls of the subprocesses are located in the outermost zone. The outermost concentric zone is separated into major outer segments aligned with the subprocesses. Within a major outer segment are controls of a subprocess with which it is aligned. A major segment is divided into m minor segments. A minor segment is a control of the subprocess. As shown, the first subprocess includes first and second controls $450_{11}$ and $450_{12}$ (e.g., m=2) while the second subprocess includes first, second and third controls $450_{21}$, $450_{22}$ and $450_{23}$ (e.g., m=3).

In one embodiment, the outermost concentric zone is divided into n equal minor segments, where n is equal to the total number of controls for all the subprocesses. As shown, the first and second subprocesses include a total of five controls (e.g., n=5). As such, the outermost concentric zone is divided into five equal minor segments. The controls of a subprocess are contained in a major segment which is contained within the boundaries of the intermediate concentric zone of the subprocess. Since the first subprocess has two controls and the second subprocess has three controls, the major segment of the first subprocess occupies ⅖ of the area of the outermost concentric zone while the major segment of the second subprocess occupies ⅗ of the area of the outermost concentric zone. Likewise, the intermediate segment of the first subprocess occupies ⅖ of the area of the intermediate concentric zone while the intermediate segment of the second subprocess occupies ⅗ of the area of the intermediate concentric zone.

Alternatively, the segments may have other configurations. For example, the control segments may have different sizes. The size of a control segment may be used to indicate its relative importance versus other controls.

Figure 6:
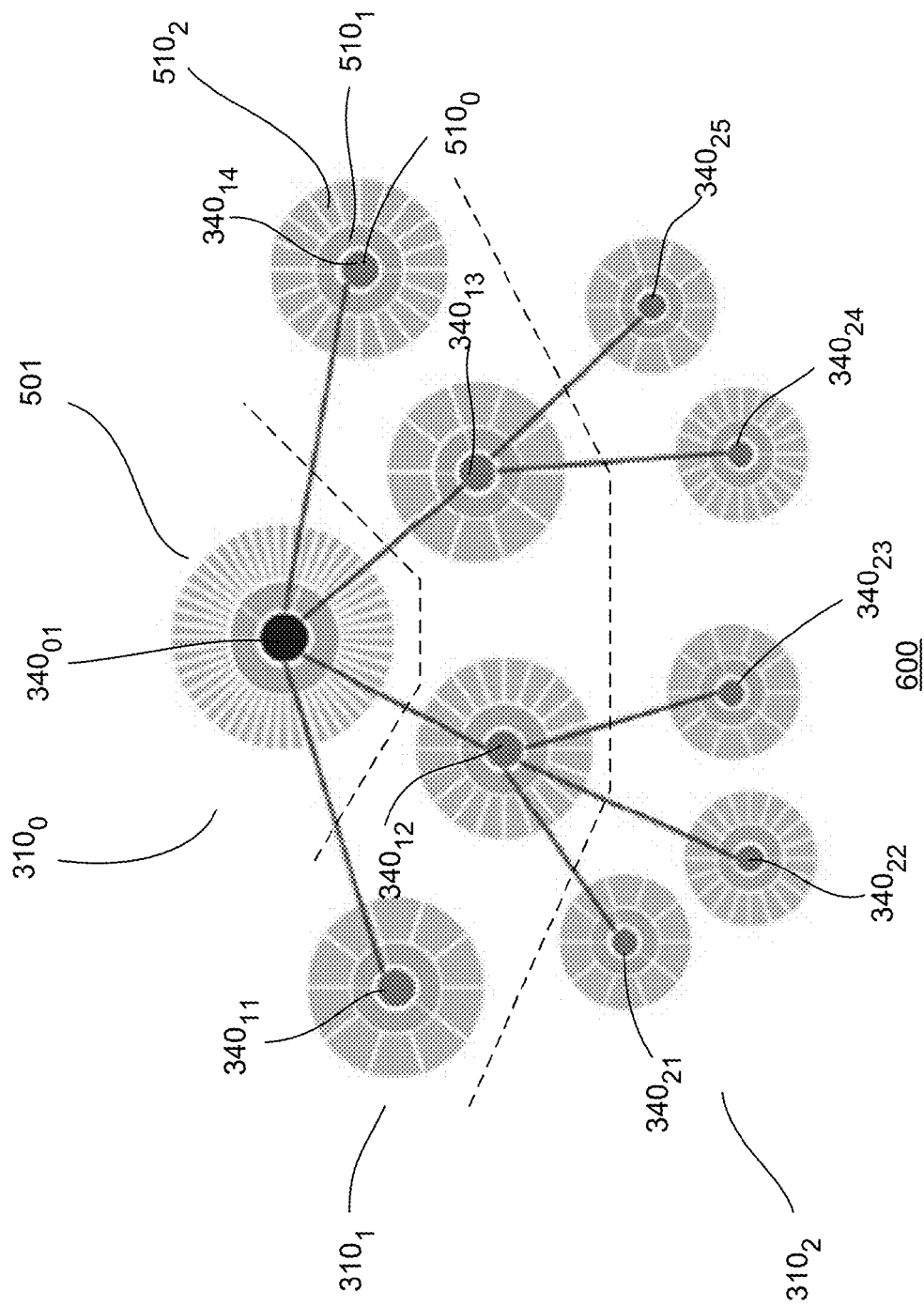
FIG. 6 shows an exemplary embodiment of a 2-dimensional representation of an organizational hierarchy with a secondary hierarchy.

FIG. 6 shows an exemplary embodiment of a 2-D multi-hierarchy view or display 600. The view includes primary and secondary hierarchies. In one embodiment, the primary hierarchy is an organization hierarchy and the secondary hierarchy is a SCS hierarchy. The organization hierarchy may be similar org unit $340_{xn}$ to that described in FIG. 3. The secondary hierarchy, for example, is a SCS hierarchy similar to that described in FIG. 4. Other types of secondary hierarchies may also be useful. Common elements may not be described or described in detail. Other types of primary and secondary hierarchies may also be displayed.

In one embodiment, the primary hierarchy is represented by a tree structure. For example, the organization hierarchy is represented by a tree structure or treemap. The tree structure includes h organizational levels. As shown, the tree structure has three levels $310_{0-2}$. Providing a hierarchy with other number of levels may also be useful. Org units $340_{xn}$ are located at the different organizational levels.

At the highest level $310_0$, org unit $340_{01}$ corresponds to, for example, the corporation. Illustratively, the intermediate level has four intermediate level org units $340_{11}$, $340_{12}$, $340_{13}$ and $340_{14}$ and the bottom level has five bottom level org units $340_{21}$, $340_{22}$, $340_{23}$, $140_{24}$ and $340_{25}$. The intermediate level org units may be major units of the corporation and the bottom level org units may be minor units of the major units. The second major org unit $340_{12}$ includes three minor org units $340_{21}$, $340_{22}$ and $340_{23}$ while the third major org unit $340_{13}$ includes two minor org units $340_{24}$ and $340_{25}$. Other configurations of the organization hierarchy may also be useful, depending on the corporation being modeled.

The units of the primary hierarchy include secondary hierarchies. For example, an org unit has a secondary hierarchy, such as a SCS hierarchy. In one embodiment, the secondary hierarchy of an org unit is represented by a radial geometric figure or object 501, similar to that described in FIG. 5. Common elements may not be described or described in detail.

The radial geometric figure of an org unit, as shown, is a circular object. Other geometric shapes for the radial object may also be useful. The radial object includes y concentric zones extending from the center. The number of concentric zones corresponds to number of levels in the SCS hierarchy. In one embodiment, the radial object includes three concentric zones $510_{0-2}$, corresponding to three levels in the SCS hierarchy. Providing other number of concentric zones may also be useful. The innermost zone is the highest level, representing an org unit. The intermediate concentric zone is the intermediate level and the outermost concentric zone is the lowest level. In the intermediate concentric zone are subprocesses of the org unit while the outermost concentric zone includes controls of the subprocesses.

As shown, the radial figures of the org units vary in size, depending on the organizational level of the org unit. For example, the larger the size of a radial figure, the higher the organizational level of the org unit. Conversely, the smaller the size of the radial figure, the lower the organizational level org unit. Org units at the same level have the same size radial figure. For example, the corporation at the top organizational level is represented by the largest radial figure, the major org units at the intermediate level have radial figures which are smaller than that of the corporation while the minor org units at the bottom level have the smallest radial figures. Other configurations of radial figures may also be useful. Lines radiate out from the org units to indicate their relationships.

In other embodiments, the secondary hierarchy may be a RCS hierarchy. The RCS hierarchy of the org units may be represented in radial figures, similar to that of the SCS hierarchy.

Figure 7A:
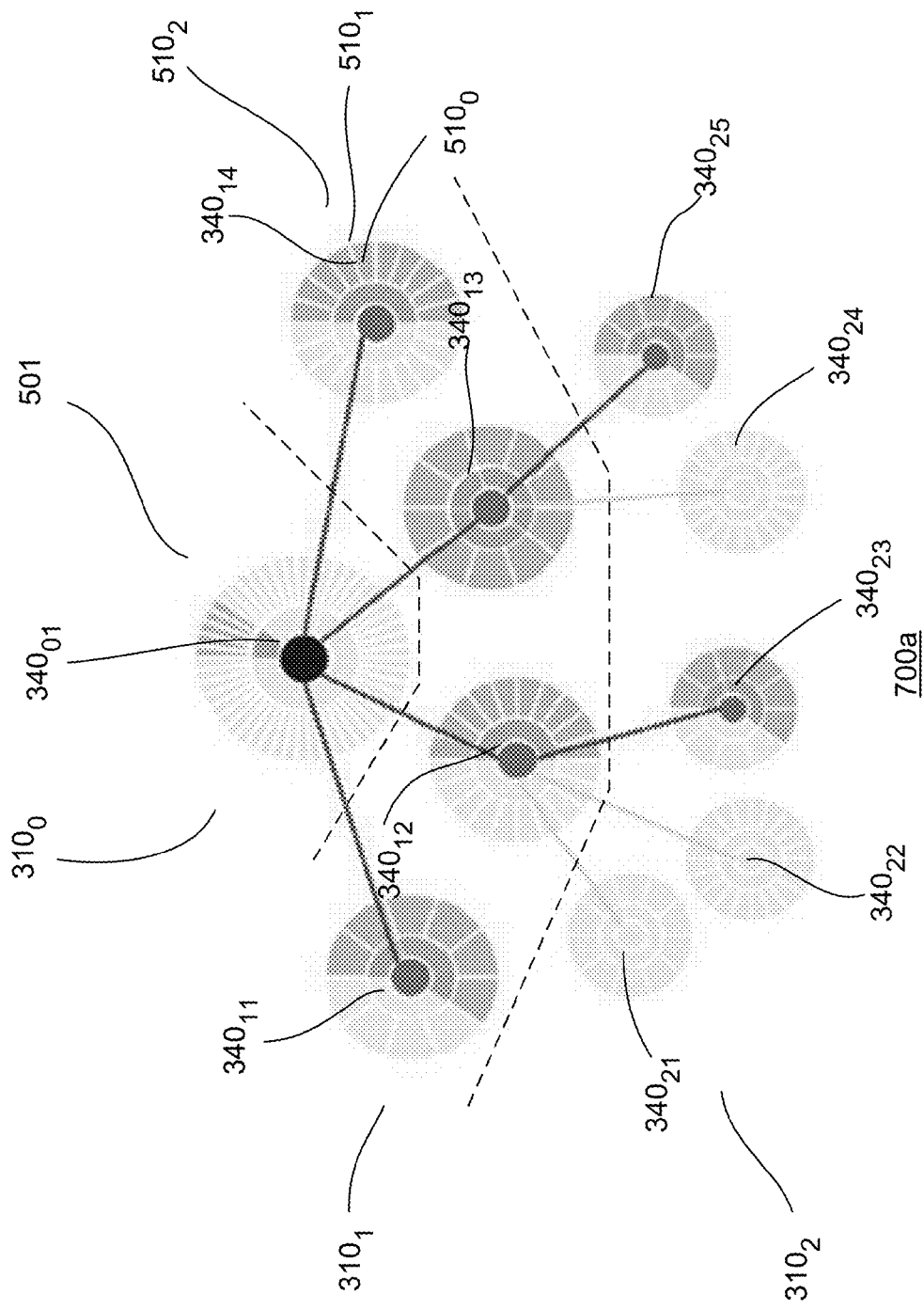
FIGS. 7a-b show exemplary embodiments of a 2-dimensional representation of an organizational hierarchy with secondary hierarchy using a filtering function.
Figure 7B:
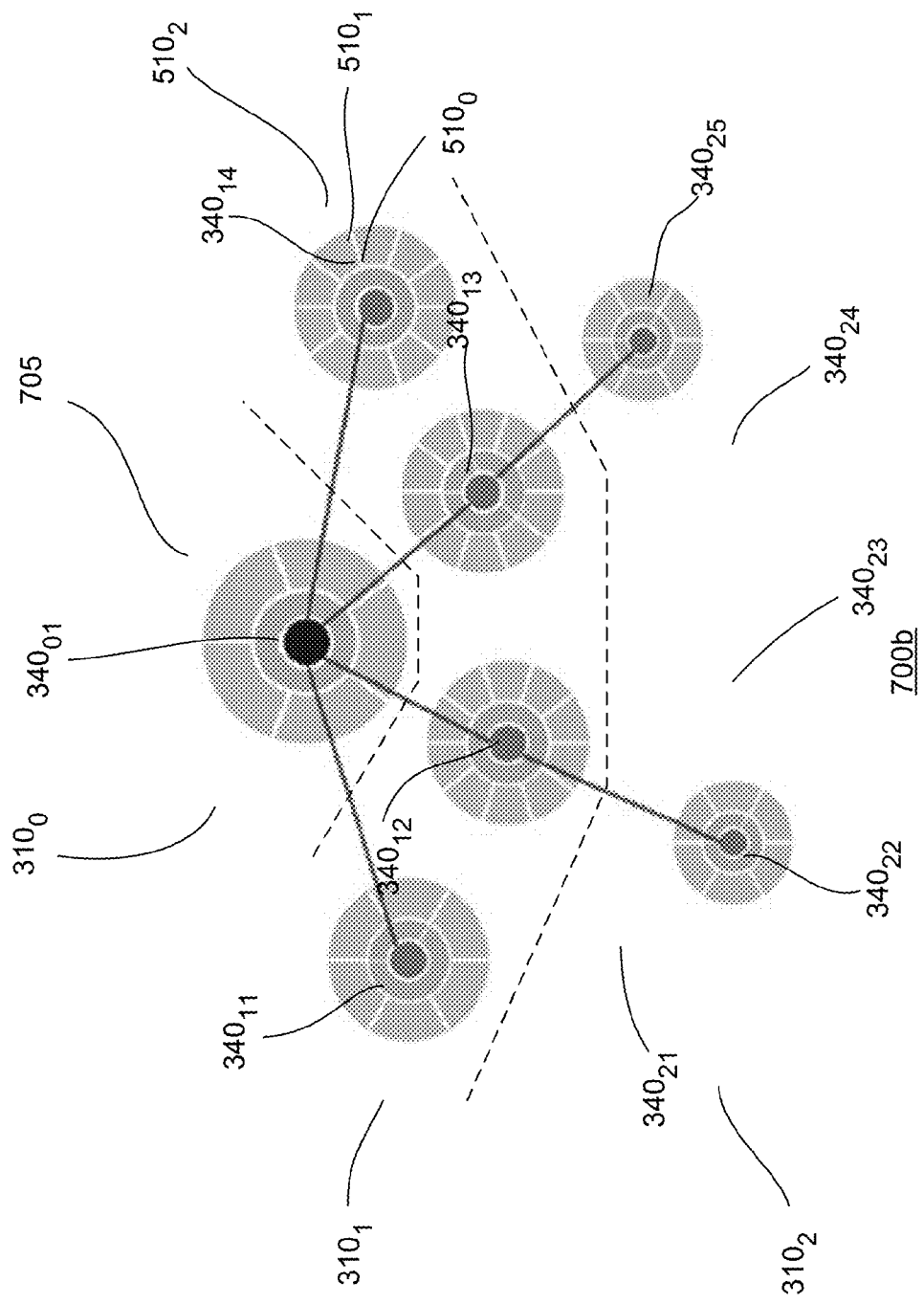

FIGS. 7a-b illustrate a filtering function for a multi-hierarchy display. Referring to FIG. 7a, a multi-hierarchy display 700a is shown. The multi-hierarchy display, for example, is similar to that shown in FIG. 6. Common elements may not be described or described in detail. A user may perform a filter for elements in the hierarchy. For example, a user may filter for elements based on criteria. Org units having subprocesses and corresponding controls which satisfy the filtering criteria may be presented in normal colors, while subprocesses and controls which do not satisfy the filtering criteria are lightened or displayed in a gray tone. Such representation may be referred to as a percentage color distribution scheme. For example, the user may filter for controls which have passed testing. Controls which have passed testing, for example will be highlighted. Other types of filtering or criteria may also be useful.

Referring to FIG. 7b, matches from the search may be displayed in a subgroup 705 of the hierarchy. For example, non-matching components are trimmed out and the remaining matching components are displayed as a subgroup hierarchy.

Figure 8:
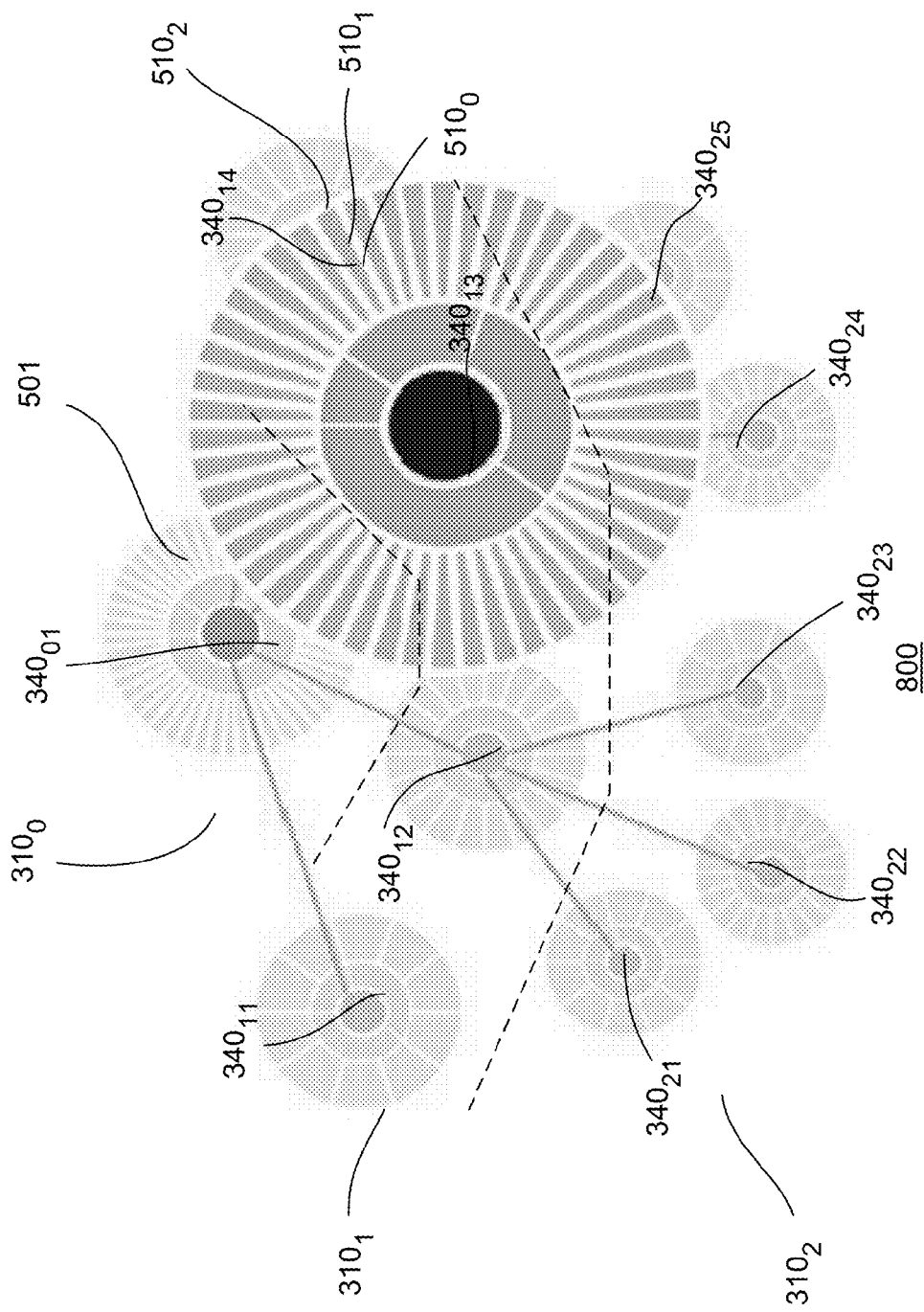
FIG. 8 shows an exemplary embodiment of a 2-dimensional representation of an organizational hierarchy with a secondary hierarchy using a drill down function.

FIG. 8 illustrates a drill down function for a multi-hierarchy display 800. The multi-hierarchy display, for example, is similar to that shown in FIG. 6. Common elements may not be described or described in detail. A user may drill down on a selected org unit. Drilling down provides, for example, detail information of the subprocesses and controls of the selected org unit. For example, the selected org unit will be displayed in the foreground while the non-selected org units are lighted and remain in the background. The user may have an option to display the subprocesses and controls in text form or in both graphical and text form.

The IFV may include a UI which displays the hierarchies as well as provide command buttons and menu bar to facilitate the user in performing various functions described. It is understood that the functions described are not limiting and other functions may be provided by the UI.

As described, the evaluator may be embodied as an application. For example, the evaluator may be embodied as a software application. The application may be integrated into an existing software application, such as a GRC application, as an add-on or plug-in to an existing application, or as a separate stand-alone application. The existing software application may be a suite of software applications. The source code of the display system may be compiled to create an executable code. The codes, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations. With respect to the use of substantially any plural and/or singular terms herein, those having ordinary skill in the art can translate from the plural to the singular and/or from the singular to the plural as is appropriate to the context and/or application.

The invention claimed is:

1. A computer-implemented method of visualizing multiple hierarchies comprising:
   providing a primary hierarchy having primary components arranged in different primary hierarchical levels, wherein the primary components of different levels are interconnected to indicate relationships of the components in the primary hierarchy, the primary components are configured as geometric objects; and
   wherein each primary component of the primary hierarchy comprises a plurality of concentric zones, wherein the concentric zones represent a secondary hierarchy of the primary component, wherein
      an innermost concentric zone of the geometric object of each primary component is the highest secondary level of the secondary hierarchy and outer concentric zones correspond to lower secondary levels of the secondary hierarchy, with an outermost concentric zone corresponding to the lowest secondary level of the secondary hierarchy,
      the concentric zones at lower secondary levels are divided into segments corresponding to a number of secondary components in the lower secondary levels, and
      wherein the primary components with the concentric zones enable visualization of multiple hierarchies within a display of the primary hierarchy.

2. A computer-implemented method of visualizing multiple hierarchies comprising:
   providing a primary hierarchy having primary components arranged in different primary hierarchical levels, wherein the primary components are configured as geometric objects; and
   providing a plurality of concentric zones for each primary component of the primary hierarchy, wherein the concentric zones represent a secondary hierarchy of each primary component, wherein
      the concentric zones correspond to different secondary hierarchical levels of the secondary hierarchy of each primary component, the secondary hierarchical levels include secondary components, wherein the primary components with the concentric zones enable visualization of multiple hierarchies within a display of the primary hierarchy.

3. The computer-implemented method of claim 2 wherein the primary components are arranged in a tree structure corresponding to the different primary hierarchical levels.

4. The computer-implemented method of claim 3 wherein:
   a number of primary hierarchical levels in the tree structure depend on a primary hierarchy model; and
   a number of secondary hierarchical levels depend on a secondary hierarchy model.

5. The computer-implemented method of claim 4 wherein the highest primary level of the tree structure corresponds to the highest primary component and lower primary levels corresponds to lower level primary components, with the lowest primary level of the tree structure corresponding to the lowest primary level of the primary hierarchy.

6. The computer-implemented method of claim 5 wherein:
   the geometric object of the primary component at the highest primary level is the largest;
   geometric objects of the primary components at lower primary levels are smaller than the geometric object at the highest level, with the primary components at the lowest primary level being the smallest; and
   geometric objects of the primary components at the same primary level are the same size.

7. The computer-implemented method of claim 5 wherein an innermost concentric zone of the geometric objects is the highest secondary level of the secondary hierarchy and outer concentric zones correspond to lower secondary levels of the secondary hierarchy, with the outermost concentric zone corresponding to the lowest secondary level of the secondary hierarchy.

8. The computer-implemented method of claim 7 wherein concentric zones at lower secondary levels are divided into segments corresponding to a number of secondary components in the lower secondary levels.

9. The computer-implemented method of claim 8 wherein lower secondary components in a lower secondary level which correspond to a secondary component at a higher lower secondary level are disposed within boundary of the segment of the corresponding secondary component in the higher lower secondary level.

10. The computer-implemented method of claim 2 wherein the primary hierarchy comprises an organization hierarchy with primary components comprising organization units.

11. The computer-implemented method of claim 10 wherein the secondary hierarchy comprises a subprocess-control structure (SCS) hierarchy of the organization units.

12. The computer-implemented method of claim 11 wherein the SCS hierarchy comprises first, second and third concentric zones corresponding to first, second and third secondary hierarchical levels,
   an innermost concentric zone is a highest secondary hierarchical level;
   an intermediate concentric zone is an intermediate secondary hierarchical level; and
   an outermost concentric zone is a lowest secondary hierarchical level.

13. The computer-implemented method of claim 12 wherein:
   the innermost zone corresponds to an organization units of the primary hierarchy;
   the intermediate concentric zone corresponds to subprocesses of the organization unit; and
   the outermost concentric zone corresponds to controls of the subprocesses.

14. The computer-implemented method of claim 13 wherein:
   the intermediate zone is divided into intermediate segments corresponding to subprocesses of the organization unit; and
   the outermost concentric zone is divided into sets of outermost segments in corresponding to sets of controls of the subprocesses, the sets of controls are disposed within boundaries of respective subprocesses.

15. The computer-implemented method of claim 10 wherein the secondary hierarchy comprises a risk-control structure (RCS) hierarchy of the organization units.

16. The computer-implemented method of claim 2 further comprising filtering the multiple hierarchies to find matching primary components based on filtering criteria.

17. A non-transitory computer-readable medium having stored thereon program code, the program code executable by a computer to:
   provide a primary hierarchy having primary components arranged in different primary hierarchical levels, wherein the primary components are configured as geometric objects; and
   provide a plurality of concentric zones for each primary component of the primary hierarchy, wherein the concentric zones represent a secondary hierarchy of each primary component, wherein
      the concentric zones correspond to different secondary hierarchical levels of the secondary hierarchy,
      an innermost concentric zone of the geometric object of each primary component is the highest secondary level of the secondary hierarchy and outer concentric zones correspond to lower secondary levels of the secondary hierarchy, with an outermost concentric zone corresponding to the lowest secondary level of the secondary hierarchy,
      wherein the primary components with the concentric zones enable visualization of multiple hierarchies within a display of the primary hierarchy.

18. A system comprising:
   a non-transitory memory device for storing computer-readable program code; and
   a processor in communication with the memory device, the processor being operative with the computer-readable program code to:
      provide a primary hierarchy having primary components arranged in different primary hierarchical levels, wherein the primary components are configured as geometric objects; and
      provide a plurality of concentric zones for each of the primary components of the primary hierarchy, wherein the concentric zones represent a secondary hierarchy of each primary component, wherein
         the concentric zones correspond to different secondary hierarchical levels of the secondary hierarchy of each primary component, the secondary hierarchical levels include secondary components, wherein the primary components with the concentric zones enable visualization of multiple hierarchies within a display of the primary hierarchy.

19. The system of claim 18 wherein the primary components are arranged in a tree structure corresponding to the different primary hierarchical levels.

20. The system of claim 19 wherein:
   a number of primary hierarchical levels in the tree structure depend on a primary hierarchy model; and
   a number of secondary hierarchical levels depend on a secondary hierarchy model.

21. The system of claim 20 wherein the highest primary level of the tree structure corresponds to the highest primary component and lower primary levels corresponds to lower level primary components, with the lowest primary level of the tree structure corresponding to the lowest primary level of the primary hierarchy.

* * * * *